US006738048B1

(12) United States Patent
Rundel

(10) Patent No.: US 6,738,048 B1
(45) Date of Patent: May 18, 2004

(54) TOUCH SCREEN CONTROLLER

(75) Inventor: Bernd M. Rundel, Tucson, AZ (US)

(73) Assignee: Texas Instruments Incorporated, Dallas, TX (US)

(*) Notice: Subject to any disclaimer, the term of this patent is extended or adjusted under 35 U.S.C. 154(b) by 12 days.

(21) Appl. No.: 09/698,848

(22) Filed: Oct. 27, 2000

Related U.S. Application Data

(60) Provisional application No. 60/162,252, filed on Oct. 29, 1999.

(51) Int. Cl.[7] ................................................ G09G 5/00
(52) U.S. Cl. ...................... 345/173; 345/177; 178/18.01
(58) Field of Search ................................. 345/173, 174, 345/175, 176, 177, 179, 180, 178, 533; 178/18.05, 18.06, 18.07, 18.02, 18.03, 18.04; 340/562; 714/48; 341/155

(56) References Cited

U.S. PATENT DOCUMENTS

| | | | | |
|---|---|---|---|---|
| 4,281,323 A | * | 7/1981 | Burnett et al. ............... | 340/562 |
| 4,663,735 A | * | 5/1987 | Novak et al. ................ | 345/533 |
| 5,191,175 A | * | 3/1993 | Protheroe et al. ........ | 178/18.02 |
| 5,225,636 A | * | 7/1993 | Protheroe ................ | 178/18.05 |
| 5,266,750 A | | 11/1993 | Yatsuzuka | |
| 5,335,230 A | * | 8/1994 | Crooks et al. ................. | 714/48 |
| 5,347,295 A | | 9/1994 | Agulnick et al. | |
| 5,495,077 A | * | 2/1996 | Miller et al. .............. | 178/18.06 |
| 5,513,309 A | | 4/1996 | Meier et al. | |
| 5,552,568 A | | 9/1996 | Onodaka et al. | |
| 5,561,447 A | | 10/1996 | Suzuki et al. | |
| 5,563,381 A | * | 10/1996 | Crooks et al. ........... | 178/18.03 |
| 5,659,154 A | | 8/1997 | Yoshikawa | |
| 5,854,881 A | * | 12/1998 | Yoshida et al. .......... | 178/18.07 |
| 5,861,583 A | | 1/1999 | Schediwy et al. | |
| 5,909,382 A | | 6/1999 | Neoh | |
| 5,956,020 A | | 9/1999 | D'Amico et al. | |
| 6,037,930 A | * | 3/2000 | Wolfe et al. .............. | 178/18.05 |
| 6,278,068 B1 | * | 8/2001 | Kuroodi ................... | 178/18.05 |
| 6,448,919 B1 | * | 9/2002 | Claxton ....................... | 341/155 |

FOREIGN PATENT DOCUMENTS

| | | |
|---|---|---|
| EP | 0 982 677 A2 | 3/2000 |
| WO | WO 96/42068 | 12/1996 |

OTHER PUBLICATIONS

International Preliminary Examination Report, Jan. 16, 2002, International Application No. PCT/US00/29573.
International Search Report, Dec. 7, 2001, International Application No. PCT/US00/29573.
Burr–Brown Corporation, *Touch Screen Controller*, Dec. 1998, 1–12.
Kao, Shih–Dean; Cheng, Yi–Ping; Tai, YupYuan and Jan, Gwo–Jen; Development and implementation of a simple digitzer for morphometry; Apr. 25, 1996; Department of Electrical Engineering, National Taiwan University, Taipei, Taiwan.

* cited by examiner

*Primary Examiner*—Chanh Nguyen
*Assistant Examiner*—Uchendu O. Anyaso
(74) *Attorney, Agent, or Firm*—W. Daniel Swayze, Jr.; W. James Brady; Frederick J. Telecky, Jr.

(57) ABSTRACT

An improved touch screen controller including a comparator and an analog-to-digital converter. The comparator of the touch screen controller detects a touch of the touch screen while the analog-to-digital converter is powered down. The Data Out (DOUT) line of the touch screen controller is used to signal the microprocessor that a touch has occurred. The unique structure of the improved touch screen controller and the fast switching edges of the comparator output signal provide for a faster touch screen controller that consumes little power without requiring a dedicated pin for the touch signal.

16 Claims, 3 Drawing Sheets

TOUCH SCREEN CONTROLLER

RELATED APPLICATIONS

This application claims priority based on U.S. provisional application serial No. 60/162,252, filed Oct. 29, 1999, hereby incorporated by reference.

BACKGROUND

1. Field of the Invention

The present invention generally relates to touch screens, and more particularly, to an improved controller for resistive touch screens.

2. Description of the Related Art

Pressure sensitive touch screens have become more prevalent in our society in recent years and are used in many diverse applications such as personal digital assistants, portable instruments, point-of-sale terminals, pagers, and various other touch screen monitors. Touch screens can be activated by many different types of contacts, including by finger, pen, and stylus. The user touches different areas of the touch screen to activate different functions. In addition, the user may use a pen or similar tool to write directly on the touch screen.

The two most popular touch technologies are analog capacitive and resistive touch screens. A resistive touch screen works by applying a voltage across a resistor network and measuring the change in resistance at a given point on the network where a screen is touched by an external source. The two most popular resistive architectures use 4-wire (400) or 5-wire (410) configurations as shown in FIG. 4. A typical resistive touch screen includes a resistive layer on an insulating material such as a glass panel. A hard-coated, conductive topsheet is overlaid on top of the resistive layer. The topsheet is separated by a layer of small insulating spacers from the resistive layer. When the surface of the conductive topsheet is touched by an external implement, for example, by pen or similar tool, or by a user's finger, the conductive coating on the topsheet is pushed against the resistive layer making electrical contact. As a result, voltages are produced that provide the analog equivalent corresponding to the position touched.

A touch screen controller, such as, for example, the ADS7845 touch screen controller from Texas Instruments Tucson Corporation, drives the touch screen. The touch screen controller has a terminal, such as a pen interrupt pin, dedicated to producing a signal when the screen is touched. Initially, the pen interrupt signal will be at a high voltage. The touch screen controller monitors the touch screen and pulls the pen interrupt signal to a low voltage when the screen is touched. The pen interrupt signal may then be output to a microprocessor. The microprocessor will then signal an analog-to-digital converter within the touch screen controller to initiate conversion of the analog voltage of the touch screen into a digital signal representing the x,y coordinate position of the touch. Since the pen interrupt pin of the touch screen controller chip is dedicated to the pen interrupt signal, the pin cannot be used for other purposes.

The pen interrupt signal is a digital signal that is pulled low when a current flow is detected from the depression of the touch screen. Further, the pen interrupt signal has slow switching edges and contributes to a slow reaction time when the screen is touched. This slow reaction time is also caused by the microprocessor setting the pen interrupt diode into a reverse bias state. Otherwise, if the pen interrupt diode is forward biased during a conversion, the additional current will cause the input data to be inaccurate.

Thus a touch screen controller is needed that will have a faster response when the screen is touched. In addition, minimizing the power consumption of the touch screen controller while waiting for touch screen input will significantly aid low power applications such as Personal Digital Assistants. Further, with the increased demand in touch screen controllers for more flexibility and additional input/output terminals, eliminating the need for a dedicated pen interrupt terminal can provide significant advantages to system designers.

SUMMARY OF THE INVENTION

A touch screen controller in accordance with the present invention addresses many of the shortcomings of the prior art. In accordance with one aspect of the present invention, the touch screen controller is configured to detect a screen touch while the touch screen controller is powered down, and the detection signal is output on a data output terminal of the touch screen controller. In accordance with an exemplary embodiment, by monitoring the analog signal from the touch screen through a static comparator, a digital signal may be generated at no power consumption. This digital signal may be output on the data output pin of the touch screen controller while the controller is in a power down mode. Thus, an additional I/O pin is not needed by the controller to monitor whether a screen touch occurs.

BRIEF DESCRIPTION OF THE DRAWINGS

A more complete understanding of the present invention may be derived by referring to the detailed description and claims when considered in connection with the following illustrative Figures, which may not be to scale. In the following Figures, like reference numbers refer to similar elements throughout the Figures.

DETAILED DESCRIPTION

The present invention may be described herein in terms of various hardware components and processing steps. It should be appreciated that such components may be realized by any number of hardware components configured to perform the specified functions. For example, the present invention may employ various integrated circuit components, e.g., comparators, resistors, analog-to-digital converters, multiplexers, memory elements, digital signal processing elements, integrators, and the like, which may carry out a variety of functions under the control of one or more microprocessors or other control devices. In addition, those skilled in the art will appreciate that the present invention may be practiced in any number of touch screen or similar contexts, such as personal computers or other computer systems, and that the preferred exemplary embodiment described herein is merely one exemplary application for the invention. Further, it should be noted that the present invention may employ any number of conventional techniques for signal processing, conditioning and the like. Such general techniques that may be known to those skilled in the art are not described in detail herein.

A touch screen controller according to various aspects of the present invention provides a driver for touch screens of various systems such as a Personal Digital Assistant, a Point of Sale terminal, or a copy machine. Although various aspects of the invention may be used in conjunction with a variety of different types of touch screens, the present invention is conveniently described below in connection with a 5-wire resistive touch screen. This exemplary implementation, however, should in no way be construed to limit the applicability of various aspects of the invention in other environments or otherwise limit the claims. For example, the present invention could be used in conjunction with other types of touch screens such as a 4-wire resistive touch screen, or any other touch screen configuration now known or hereinafter devised.

Figure 1:
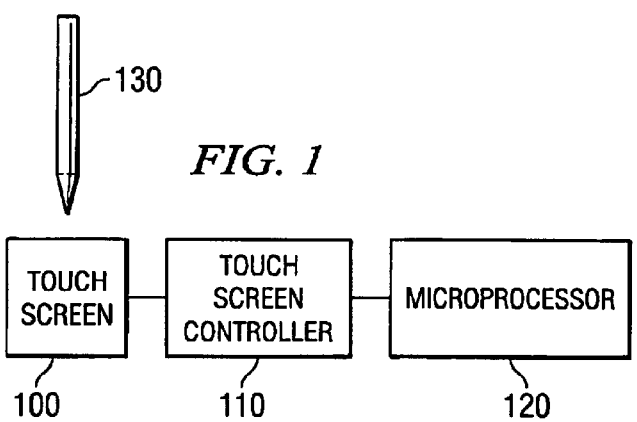
FIG. 1 illustrates a block diagram of a touch screen system.

FIG. 1 is a block diagram of a conventional touch screen system comprising a 5-wire resistive touch screen 100, a touch screen controller 110, and a microprocessor 120. An external implement, such as, for example, a pen 130 can be used to touch the screen and enter data into the system. Touch screen controller 110 drives touch screen 100 and outputs data from touch screen 100, in the form of digital signals, to microprocessor 120. Microprocessor 120 also sends data, such as commands to signal touch screen controller 110 to start converting the analog voltage of touch screen 100 into a digital signal representing the x,y coordinate of a screen touch. The present embodiment is merely illustrative of a typical touch screen system and many other configurations are possible, such as using a 4-wire touch screen or adding a central processing unit or another input/output (I/O) device.

Figure 2:
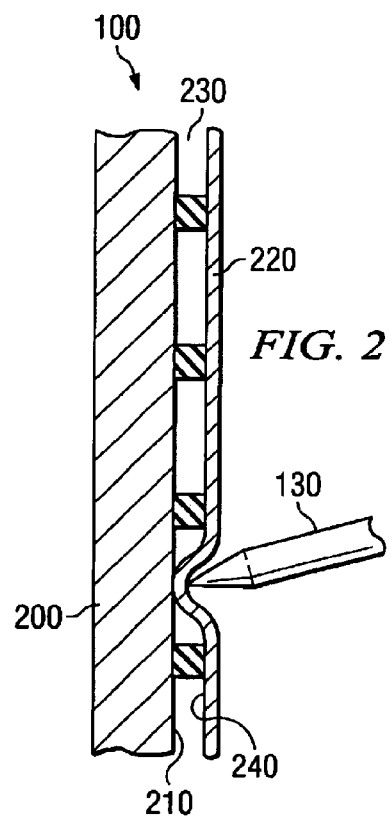
FIG. 2 illustrates the major components of an exemplary touch screen that can be driven by the touch screen controller of the present invention.
Figure 4:
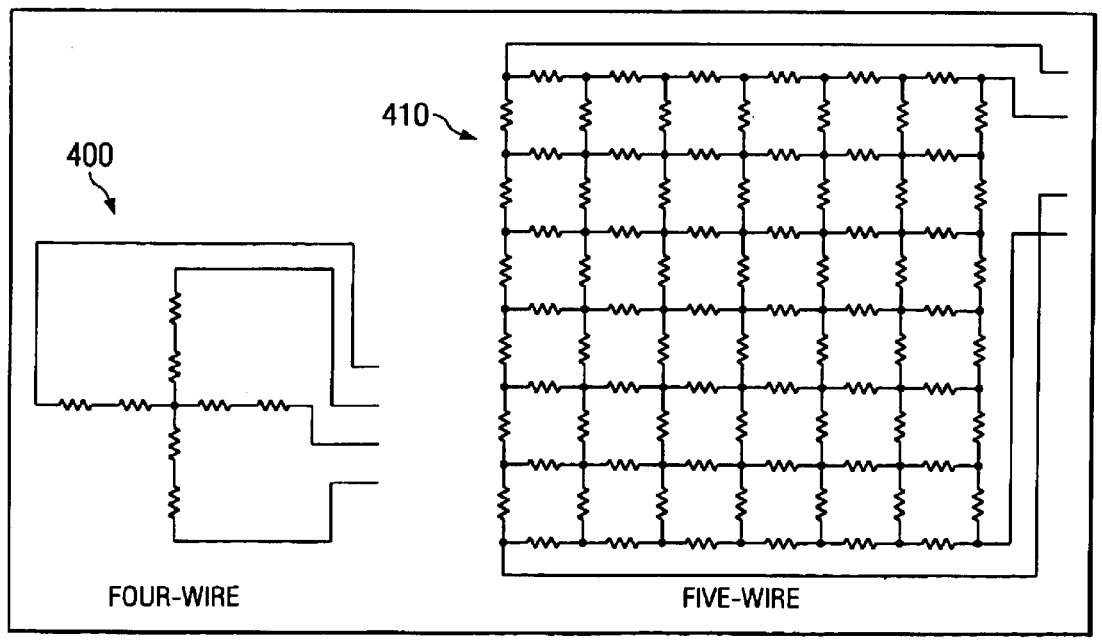
FIG. 4 illustrates the architecture of a prior art 4-wire and 5-wire resistive network.

The operation of a typical 5-wire resistive touch screen is well known and therefore will not be described in detail. However, a general description of the structure and operation of touch screen 100 is helpful in describing the present invention. FIG. 2 illustrates the major components of touch screen 100. As previously discussed, touch screen 100 includes a glass panel 200 with a resistive layer 210 attached to one side of the glass panel. A hard-coated topsheet 220 is overlaid on glass panel 200 on the same side as the resistive layer. Topsheet 220 has a conductive coating 230 and the topsheet is separated by a layer of small spacers 240 from resistive layer 210. When the surface of conductive topsheet is depressed by a touch, such as that made by pen 130, the conductive coating on topsheet 220 is pushed against resistive layer 210 making electrical contact. Voltages are produced that are the analog equivalent of the x,y position touched.

Figure 3:
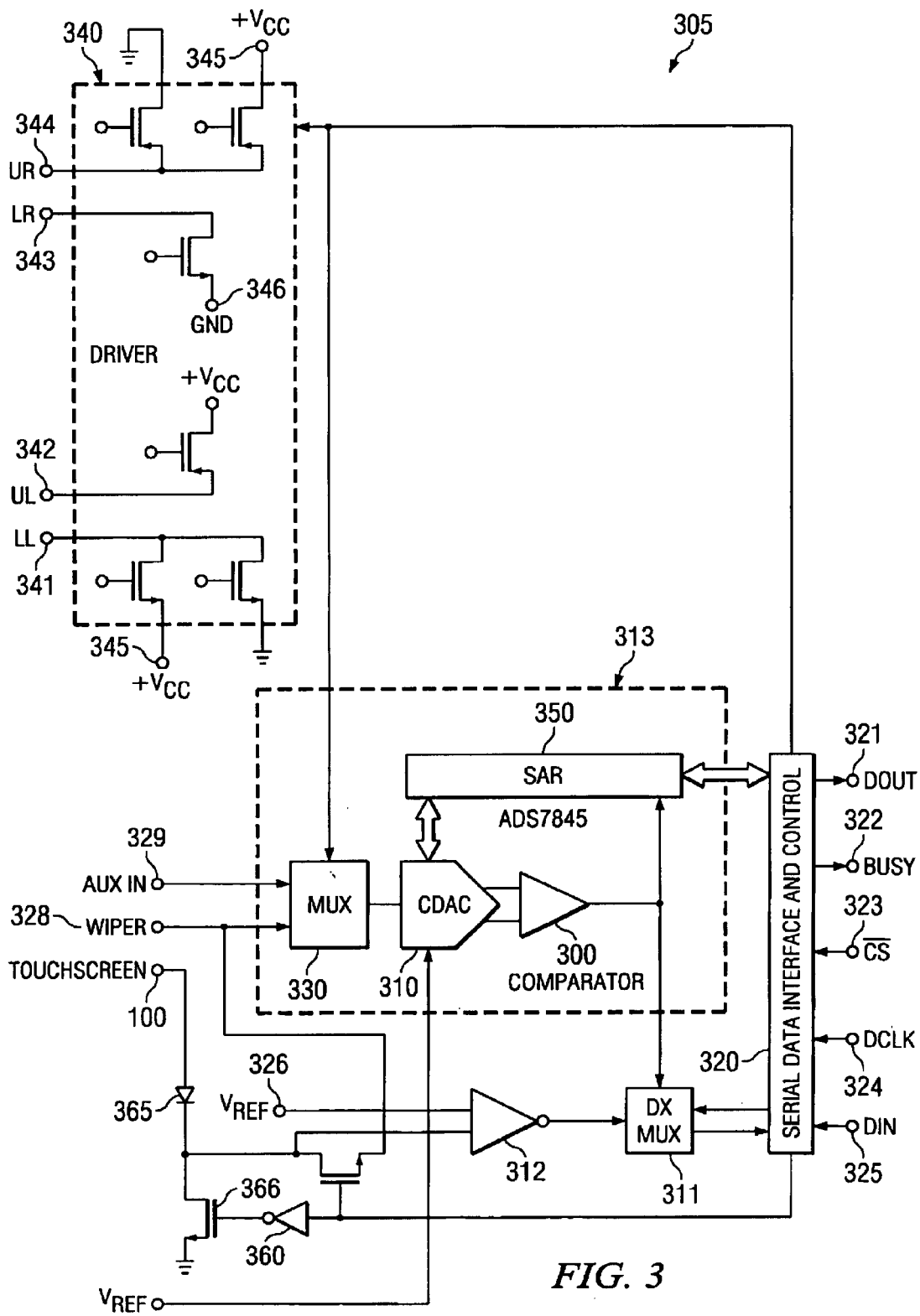
FIG. 3 illustrates a functional diagram of a touch screen controller in accordance with the present invention.

The voltages that are produced by the touch are monitored by a touch screen controller 305, such as the exemplary touch screen controller 305 illustrated in FIG. 3 in accordance with the present invention. In accordance with this exemplary embodiment, touch screen controller 305 comprises a 12-bit sampling analog-to-digital converter. However, it will be appreciated that touch screen controller 305 could alternatively comprise an analog-to-digital converter that produces a different number of bits and is of a different configuration. Touch screen controller 305 includes a diode 365, a comparator 312, a digital multiplexer 311, a comparator 300, a touch screen driver 340, a Successive Approximation Register (SAR) 350, a capacitor digital-to-analog converter (CDAC) 310, a control logic component 320 such as a Serial Data Interface and Control, and a multiplexer 330. Touch screen controller 305 may have any number of terminals, such as pins, ports or the like, and the touch screen controller may output data having any number of bits; however, in the preferred exemplary embodiment, touch screen controller 305 comprises a 16-pin (not all pins are shown), 12-bit sampling analog-to-digital converter with a synchronous serial interface and low on-resistance switches for driving touch screens. Four pins 341–344 of touch screen driver 340 are connected to the lower left (LL), upper left (UL), lower right (LR), and upper right (UR) regions of the touch screen. Pin 325 is connected to Data In (DIN) and is used to receive control bits serially from a microprocessor, such as a microprocessor 120. Pin 321 is connected to Data Out (DOUT) and is used to supply data to the microprocessor.

An analog-to-digital conversion portion 313 of touch screen controller 305 comprises multiplexer 330, CDAC 310, SAR 350, and comparator 300. Analog-to-digital conversion portion 313 is used for the analog-to-digital conversion of the voltages produced by the touch screen into a digital signal. This digital signal represents the x,y position of a touch of the touch screen. Comparator 312 is used for the initial detection of a touch as will be described next.

The input of comparator 312 comprises a reference voltage 326 and a voltage from touch screen 100. The output of comparator 312 is connected to digital multiplexer 311, and the output of digital multiplexer 311 is connected to control logic component 320. Comparator 312 is a standard comparator having only two logic output states (LOW or HIGH), for comparing the voltage of touch screen 100 to reference voltage 326 such that a touch of touch screen 100 can be detected. The output of comparator 312 is sent to control logic component 320 which writes the data to DOUT 321 of touch screen controller 305.

Figure 5:
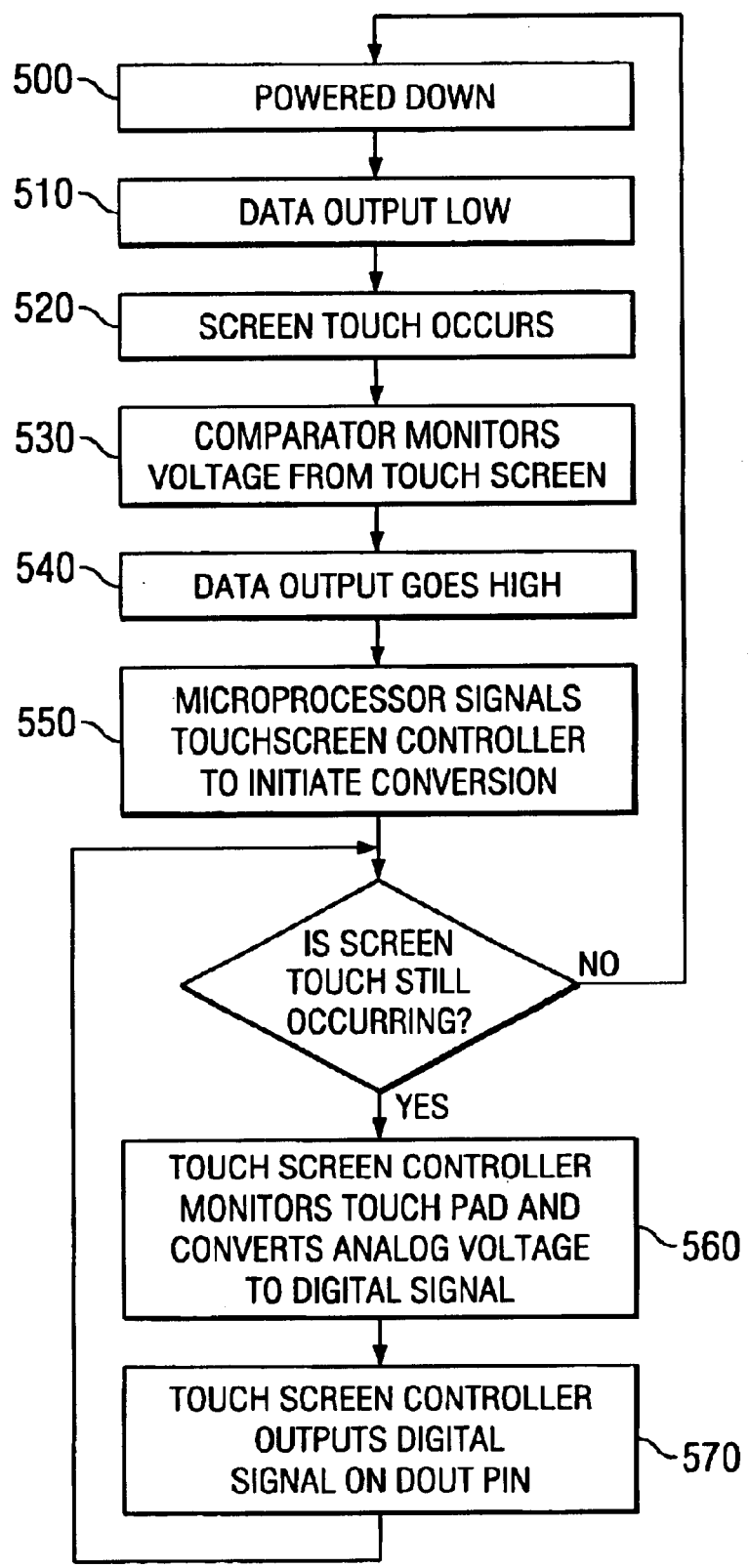
FIG. 5 illustrates a flow diagram of the touch screen controller of FIG. 3.

Having described a touch screen controller as may be used with a touch screen in accordance with a preferred exemplary embodiment, the operation of a touch screen controller configured to detect a screen touch while in power down mode, and output a signal, on a shared DOUT pin, that indicates the screen touch occurred will now be described in accordance with an exemplary method for detecting. The touch screen controller 305 is powered down while in a wait state (step 500 of FIG. 5). During this wait period, DOUT of touch screen controller 305 is enabled and set to LOW (all binary bits set to zero) (step 510). While the touch screen is untouched, diode 365 of the touch screen controller is not biased, and no current (or negligible leakage current) will flow. Thus, the output of comparator 312 may be LOW when there is no touch occurring. The output of comparator 312 is fed into control logic component 320 via digital multiplexer 311. When no touch is occurring, a LOW digital signal (e.g., all binary bits set to zero) may be output on DOUT pin 321 which signals processor 120 that no touch is occurring.

When a screen touch occurs (step 520), voltages are produced by the electrical contact of resistive layer 210 and topsheet 220 as previously described. The voltages are the analog representation of the x,y coordinate position touched. The voltages produced are input into comparator 312 which compares the voltage of the touch screen to reference voltage 326 (step 530). When the touch screen is pressed (step 520), diode 365 of the touch screen controller is forward biased and current flows to complete this current loop to ground. Now, the voltage from the touch screen into comparator 312 is pulled low to about one forward voltage drop of diode 365. The low going voltage level will cause comparator 312 to output a HIGH signal as a result of the comparison of the touch screen voltage to the reference voltage. The HIGH output signal of comparator 312 is sent to control logic component 320 which writes a HIGH digital signal (e.g., all binary bits set to one) to the DOUT pin of touch screen controller 305. This effectively pulls the DOUT signal to high (step 540). Microprocessor 120 senses the high signal from the DOUT pin and signals the touch screen controller to initiate conversion of the analog voltage of the touch screen into a digital signal (step 550). The sharp difference or edges between the HIGH and LOW signals of the comparator enable the touch screen to have a faster response time. In addition, since all touch screens have end resistance, all "0"s and all "1"s are an unused set of codes. It will be appreciated that the LOW and HIGH signals output from comparator 312 could be reversed in the above example, so that the digital signal output on the DOUT pin is HIGH when no screen touch is occurring, and the digital signal is LOW when a screen touch is occurring.

By monitoring the analog signal from the touch screen through a static comparator, a digital signal may be generated at no power consumption. As described above, this digital signal may be output on the DOUT pin of the touch screen controller while in the power down mode. Thus, an additional I/O pin is not needed to monitor whether a screen touch occurs. While a screen touch is occurring, touch screen controller 305 is powered up and converts the analog voltage into a digital signal (step 560) by using the analog-to-digital portion 313 of touch screen controller 305. Touch screen controller 305 writes the digital signal to the DOUT pin which is monitored by microprocessor 120, When the screen touch is completed, touch screen controller 305 is powered down (step 500) and DOUT is set to LOW (step 510) while the touch screen controller waits for another screen touch.

In addition, a system designer could program touch screen controller 305 to optionally use either a shared pin (e.g., DOUT pin) or a separate, dedicated pin for the signal that indicates that a screen touch has occurred.

The present invention has been described above with reference to an exemplary embodiment. However, those skilled in the art will recognize that changes and modifications may be made to the exemplary embodiment without departing from the scope of the present invention. For example, the various components or processing steps of the touch screen controller may be implemented in alternate ways or in an alternate order depending upon the particular application or in consideration of any number of cost functions associated with the operation of the system, e.g., the comparator, multiplexer, terminals, switches, or other components may be laid out in different sequences or in different areas of an integrated circuit. In addition, the techniques described herein may be extended or modified for use with various other applications, such as, for example, a keyboard input device. These and other changes or modifications are intended to be included within the scope of the present invention.

What is claimed is:

1. A touch screen controller for controlling a touch screen and for detecting a screen touch of the touch screen, the touch screen controller comprising:
   a comparator having a first input and a second input, wherein the comparator is configured to produce an output that is a function of a comparison of the first input and the second input;
   a digital multiplexer electrically connected to the comparator, wherein the digital multiplexer is configured to receive the output of the comparator and output a first digital signal representative of the output, wherein the first digital signal is indicative of whether the screen touch is occurring, wherein the first digital signal is a LOW digital signal when the screen touch is not occurring, and wherein the first digital signal is a HIGH digital signal when the screen touch is occurring;
   an analog-to-digital portion for converting a voltage produced by the touch screen into a second digital signal, wherein the second digital signal is indicative of an x,y position of the screen touch;
   a control logic component electrically connected to the digital multiplexer, wherein the control logic component is configured to receive the first digital signal of the digital multiplexer and the second digital signal of the analog-to-digital portion; and
   a plurality of pins electrically connected to the control logic component, wherein one of the plurality of pins comprises a data output pin, wherein the data output pin is configured to output both the first digital signal and the second digital signal received from the control logic component, wherein the first digital signal is output as the HIGH digital signal to indicate that the screen touch is occurring before the second digital signal is output.

2. The touch screen controller of claim 1 wherein the first input of the comparator is representative of a voltage of the touch screen and the second input of the comparator is representative of a reference voltage.

3. The touch screen controller of claim 1, wherein the analog-to-digital portion comprises:
   an analog multiplexer;
   a capacitor digital-to-analog converter electrically connected to the analog multiplexer;
   a successive approximation register electrically connected to the digital-to-analog converter; and
   a second comparator electrically connected to the successive approximation register.

4. A touch screen system comprising:
   resistive touch screen;
   a touch screen controller electrically connected to the resistive touch screen, wherein the touch screen controller comprises:
      a comparator having a first input connected to the touch screen and a second input connected to reference voltage, wherein the comparator is configured to produce an output that is a function of a comparison of the first input and the second input;
      a digital multiplexer electrically connected to the comparator, wherein the digital multiplexer is configured to receive the output of the comparator and output a first digital signal representative of the output, wherein the first digital signal is indicative of whether a screen touch is occurring, wherein the first digital signal is a LOW digital signal when the screen touch is not occurring, and wherein the first digital signal is a HIGH digital signal when the screen touch is occurring;
      an analog-to-digital portion for converging a voltage produced by the touch screen into a second digital signal, wherein the second digital signal is indicative of an x,y position of the screen touch;
      a control logic component electrically connected to the digital multiplexer, wherein the control logic component is configured to receive the first digital signal of the digital multiplexer and the second digital signal of the analog-to-digital portion; and
      a plurality of pins electrically connected to the control logic component, wherein one of the plurality of pins comprises a data output pin, wherein the data output pin is configured to output both the first digital signal and the second digital signal received from the control logic component, wherein the first digital signal is output as the HIGH digital signal to indicate that the screen touch is occurring before the second digital signal is output; and a microprocessor electrically connected to the control logic component of the touch screen controller, wherein the microprocessor is configured to receive the first and second digital signals of the touch screen controller.

5. The touch screen system of claim 4 wherein the first input of the comparator is representative of a voltage of the touch screen and the second input of the comparator is representative of a reference voltage.

6. The touch screen system of claim 4 wherein the analog-to-digital portion comprises:

an analog multiplexer;

a capacitor digital-to-analog converter electrically connected to the analog multiplexer;

a successive approximation register electrically connected to the digital-to-analog converter; and a second comparator electrically connected to the successive approximation register.

7. A method for detecting a touch of a touch screen by using a touch screen controller, the method comprising the steps of:

powering down the touch screen controller;

outputting a first digital signal on a pin of the touch screen controller, wherein the first digital signal is representative that the touch is not occurring and the pin of the touch screen controller is shared for a data out signal, wherein the first digital signal comprises a LOW digital signal;

comparing a voltage from the touch screen to reference voltage and producing a comparison signal based on the result of the comparison, wherein the touch screen voltage is the analog equivalent of a coordinate position of the touch;

outputting a second digital signal on the pin of the touch screen controller, wherein the second digital signal is generated from the comparison signal and the second digital signal is representative that the touch is occurring, wherein the second digital signal comprises a HIGH digital signal;

converting the voltage from the touch screen to a digital data; and outputting the digital data in the form of the data out signal on the pin of the touch screen controller, wherein the digital data comprises x,y coordinate information for the touch, wherein the second digital signal is output before the data out signal.

8. A driver for a touch screen of a device for controlling a touch screen, the driver comprising:

a control logic component, wherein the control logic component is configured to receive a first digital signal and a second digital signal, wherein the first digital signal is indicative of whether a screen touch is occurring, wherein the first digital signal is a LOW digital signal when the screen touch is not occurring, and wherein the first digital signal is a HIGH digital signal when the screen touch is occurring, and wherein the second digital signal is indicative of an x,y position of the screen touch, wherein the first digital signal is output as the HIGH digital signal to indicate that the screen touch is occurring before the second digital signal is output; and a plurality of pins electrically connected to the control logic component, wherein one of the plurality of pins comprises a data output pin, wherein the data output pin is configured to output both the first digital signal and the second digital signal received from the control logic component.

9. The driver according to claim 8, further comprising:

a comparator having a first input and a second input, wherein the comparator is configured to produce an output that is a function of a comparison of the first input and the second input; and a digital multiplexer electrically connected to the comparator, wherein the digital multiplexer is configured to receive the output of the comparator and output the first digital signal representative of the output of the comparator.

10. The driver according to claim 8, further comprising an analog-to-digital portion for converting a voltage produced by the touch screen into the second digital signal.

11. The driver according to claim 8, wherein the data output pin is configured to output both the first digital signal and the second digital signal to a microprocessor.

12. The driver according to claim 8, wherein the device is a personal digital assistant.

13. The driver according to claim 8, wherein the device is a point of sale terminal.

14. The driver according to claim 8, wherein the touch screen is a 5-wire resistive touch screen.

15. The driver according to claim 8, wherein the touch screen is a 4-wire resistive touch screen.

16. A device for detecting a screen touch of a touch screen, the device comprising:

a control logic, wherein the control logic component is configured to receive a first digital signal and a second digital signal, wherein the first digital signal is indicative of whether the screen touch is occurring, wherein the first digital signal is a LOW digital signal when the screen touch is not occurring and the first digital signal is a HIGH digital signal when the screen touch is occurring, and wherein the second digital signal is indicative of an x,y position of the screen touch; and a plurality of pins electrically connected to the control logic component, wherein one of the plurality of pins comprises a data output pin, wherein the data output pin is configured to output both the first digital signal and the second digital signal received from the control logic component, wherein the first digital signal is output as the HIGH digital signal to indicative that the screen touch is occurring before the second digital signal is output.

* * * * *